Oct. 7, 1969 F. C. BOLICK, JR 3,471,072

TAPE DRIVING DEVICE

Original Filed March 25, 1966

INVENTOR

FRED C. BOLICK, JR.

BY: Newton, Hopkins, Jones & Ormsby

ATTORNEYS

United States Patent Office 3,471,072
Patented Oct. 7, 1969

3,471,072

TAPE DRIVING DEVICE

Fred C. Bolick, Jr., Atlanta, Ga., assignor to Lanier Electronics Laboratory, Inc., Atlanta, Ga., a corporation of Georgia Continuation of application Ser. No. 537,434, Mar. 25, 1966. This application July 26, 1968, Ser. No. 752,445
Int. Cl. B65h *17/20*
U.S. Cl. 226—187 9 Claims

ABSTRACT OF THE DISCLOSURE

The invention disclosed is a tape driving device for providing motion to a tape by selectively urging two rollers together on opposite sides of the tape and including a plunger movable by a solenoid between a first location and a fixed second location relative to the solenoid, and a resilient means for operatively connecting the plunger to one of the rollers so that the resilient means is extended by motion of the plunger from the first location to the second location to provide a resilient force which is the sole force urging the rollers toward each other.

This is a continuation of Ser. No. 537,434, filed Mar. 25, 1966, now abandoned.

This invention relates to a tape driving device and more particularly, to a tape driving device for driving a tape to provide tape motion.

In that sound recording and reproducing equipment which uses a magnetic tape for the recording, storing, and reproducing of information, it is customary to selectively move the magnetic tape relative to various recording-reproducing heads or similar devices. Thus, such recording and reproducing equipment must include one or more tape driving devices for providing such motion.

In most prior art recording and reproducing equipment, these tape driving devices have included a driven roller and an idler roller between which the magnetic tape passes and which together drive the magnetic tape in the direction determined by the direction of rotation of driven roller when both rollers are forced against the tape by the operation of a roller positioning means. A roller positioning means frequently used in the prior art for tape driving devices is a plunger which moves relative to a solenoid when the solenoid is energized and de-energized and whose motion serves through an appropriate linking mechanism to move the rollers relative to each other.

This type of roller positioning means and other types using a plunger and solenoid provide a conveniently operated tape driving device. This is because a plunger and solenoid provide selective control of magnetic tape motion simply by selectively energizing and de-energizing the solenoid.

A difficulty with prior art tape driving devices having a roller positioning means using a plunger and solenoid is that the position of the plunger relative to the solenoid when the rollers are engaging and driving the magnetic tape must be carefully established and maintained if uniform motion of the magnetic tape is to be achieved. This is because the power supply for the solenoid and the position of the plunger relative to the solenoid when the rollers are engaging and driving the magnetic tape determine the force with which the rollers engage the magnetic tape and because any variation in the power supply or in the position of the plunger relative to the solenoid causes a corresponding variation in this force and undesirable slippage of the magnetic tape relative to the rollers.

It is the requirement for carefully establishing and maintaining the position of the plunger relative to the solenoid when the rollers are engaging and driving the magnetic tape which has increased the cost of prior art tape driving devices and which has made sound recording and reproducing equipment containing such tape driving devices difficult and expensive to maintain under the operating conditions to which such equipment is customarily exposed.

The invention disclosed herein avoids these and other difficulties with prior art tape driving devices while at the same time retaining the advantages inherent in using a plunger and solenoid in a tape driving device. The invention disclosed herein achieves this result by using the energizing and de-energizing of a solenoid and the resulting motion of a plunger to move the rollers relative to each other and by using only the resiliency of a resilient means such as a spring to provide the force with which the rollers are urged together to engage the magnetic tape.

The force provided by the resiliency of the resilient means is obtained by deforming the resilient means with motion of the plunger relative to the solenoid and the motion of the plunger each time the solenoid is energized includes both that motion necessary to bring the rollers into tape engaging position and that additional motion necessary to deform the resilient means. This additional motion of the plunger is always that motion subsequent to the rollers engaging the magnetic tape which is required to move the plunger into a predetermined position within the solenoid and although this additional motion will change in amplitude depending upon the position of the plunger relative to the solenoid when the rollers engage the tape, the force provided by the resilient means is relatively constant over a wide range of amplitudes of plunger motion and resulting deformations of the resilient means.

Thus, the force with which the rollers are urged toward one another to engage and drive the magnetic tape is relatively constant regardless of any variations in the additional motion of the plunger within the solenoid which occur because of changes in the position of the plunger relative to the solenoid and regardless of variations in the power supply for the solenoid. It is because of this that the careful establishing and maintaining of the position of the plunger relative to the solenoid and power supply control that are required in the prior art to maintain the force with which the rollers are urged toward one another to engage and move a magnetic tape is completely avoided by the invention.

These and other features and advantages of the invention will be more clearly understood from the following detailed description and the accompanying drawings in which like characters of reference designate corresponding parts throughout and in which.

Figure 2:
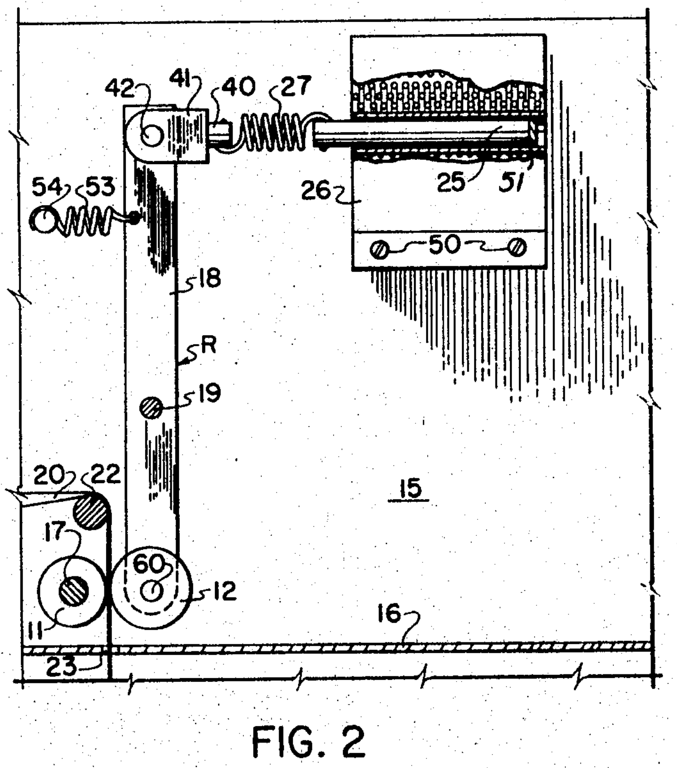
FIG. 2 is a sectional view of that embodiment of the invention shown in FIG. 1 taken in line 2—2 in FIG.1.

These figures and the following detailed description disclose a specific embodiment of the invention but the invention is not limited to the details disclosed since it may be embodied in other equivalent forms.

The tape driving device 10 disclosed herein is best understood as comprising opposed driving elements such as a driven roller 11 and an iddler roller 12, and a positioning means R for moving the idler roller 12 relative to the driven roller 11. In that embodiment of the invention disclosed herein, the tape driving device 10 is positioned within a chamber 13 defined by a side member 14, a side member 15 which is parallel to and spaced apart from the side member 14, and a bottom member 16 extending between the side member 14 and the side member 15.

Moreover, in the embodiment of the invention disclosed herein, the driven roller 11 is fixedly mounted on a shaft 17 which is journalled in the side members 14 and 15 for rotation by an electric motor or other suitable power means (not shown). Thus, the driven roller 11 is fixedly positioned within the chamber 13 but rotates about the axis of rotation of the shaft 17 when an electric motor or other power means (not shown) is operated.

The idler roller 12 is moved relative to the driven roller 11 to provide motion of the rollers 11 and 12 relative to each other and this motion of the idler roller 12 is provided by the positioning means R which includes a lever 18 having the idler roller 12 rotatably mounted on an axle 60 at its lower end. The lever 18 is pivotably mounted on a shaft 19 extending between the side members 14 and 15 with its centerline substantially parallel to the axis of rotation of the shaft 17.

It will be seen from FIG. 2, that the position of the shaft 19 and the length of the lever 18 between the shaft 19 and the idler roller 12 are such as to place the idler roller 12 adjacent the driven roller 11 and it will be understood that pivotable motion of the lever 18 about the centerline of the shaft 19 in a clockwise direction as viewed in FIG. 2 results in the idler roller 12 engaging the driven roller 11 and pivotable motion of the lever 18 about the centerline of the shaft 19 in a counterclockwise direction as viewed in FIG. 2 results in the idler roller 12 moving away from the driven roller 11.

Further, it will be understood that the tape driving device 10 disclosed herein as thus far described is conventional in that pivotable motion of the lever 18 is used to provide relative motion of the rollers 11 and 12 with respect to each other. As with prior art tape driving devices, a tape such as a magnetic tape 20 passing between the rollers 11 and 12 will be moved by the tape driving device 10 when the idler roller 12 is moved toward the driven roller 11 by pivotable motion of the lever 18. Motion of the tape 20 is discontinued when the idler roller 12 is moved away from the driven roller 11 by the opposite pivotable motion of the lever 18 in response to the release spring 53 extending between the lever 18 and a peg 54 positioned on the side member 15.

The direction of the motion of the tape 20 is dependent upon the direction of rotation of the driven roller 11 in conventional manner and in that embodiment of the invention disclosed herein, driven roller 11 is rotated in a clockwise direction as shown in FIG. 2. Thus, it will be understood that the tape 20 enters the chamber 13 over a guide roll 22 extending between the side members 14 and 15 and leaves the chamber 13 through a slot 23 in the bottom member 16. It will also be understood that the tape 20 may be moving to a recording-reproducing head (not shown) or a storage chamber (not shown) as it leaves the chamber 13 depending upon the particular arrangement of the recording-reproducing equipment (not shown) with which the tape driving device 10 is used.

Figure 1:
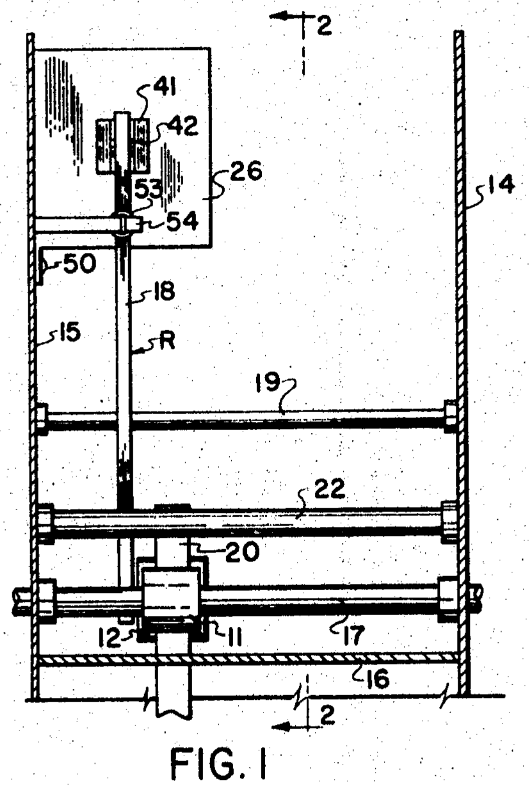
FIG. 1 is a front elevational view of an embodiment of the invention arranged to drive a magnetic tape.

It is because the driven roller 11, the idler roller 12, and the lever 18 for positioning the rollers 11 and 12 relative to each other and to a tape 20 are conventional in prior art tape driving devices that they and their cooperation with recording-reproducing equipment (not shown) have not been described in greater detail above. Moreover, since it is also conventional in prior art tape driving devices to pivot the lever 18 of the positioning means R by motion of a plunger 25 within a solenoid 26 as shown in FIGS. 1 and 2, the circuitry required to energize and de-energize the solenoid 26 when it is desired to provide or stop motion of the tape 20 is not described herein.

However, unlike prior art tape driving devices, the positioning means R of the tape driving device 10 disclosed herein includes a resilient means such as the spring 27 between the plunger 25 and that end of the lever 18 which is opposite the end of the lever 18 at which the idler roller 12 is mounted. In that embodiment of the invention disclosed herein, the spring 27 is operatively connected to the extending end of the plunger 25 by inserting one end of the spring 27 through a hole (not shown) in the plunger 25 and is operatively connected to the lever 18 by inserting the opposite end of the spring 27 through a hole (not shown) in a tab 40 carried by a U member 41 pivotably attached by a pin 42 to the lever 18.

The solenoid 26 is mounted on the side member 15 by fasteners 50 in that position which results in the initial motion of the plunger 25 to the right as viewed in FIG. 2 when the solenoid 26 is energized being of an amplitude which is sufficient to pivot the idler roller 12 into engagement with the tape 20 so as to move the tape 20 against the driven roller 11, but which is not sufficient for the plunger 25 to engage the stop 51 at that end of the solenoid 26 remote from the lever 18. The spring 27 is selected to have a resiliency which permits its extension with a force less than that force with which the magnetic field of the solenoid 26 urges the plunger 25 within the solenoid 26.

As a result, after motion of the idler roller 12 and of the lever 18 is stopped by the idler roller 12 engaging the tape 20 and urging the tape 20 against the driven roller 11, there is additional motion of the plunger 26 to the right as viewed in FIG. 2 until the plunger 26 engages the stop 51. There is also a corresponding expansion of the spring 27 with the amplitude of the expansion of the spring 27 being dependent upon the amplitude of the additional motion of the plunger 25, required for the plunger 25 to engage the stop 51 or otherwise reach a predetermined position within the solenoid 26 such as that provided by the position of equilibrium of the plunger 25 within the solenoid 26 in the absence of the stop 51.

Once the plunger 25 engages the stop 51 within the solenoid 26, it remains in this predetermined position as long as the solenoid 26 is energized as is well known to those skilled in the art. It will now be understood that it is only the resiliency of the spring 27 resulting from the expanding of the spring 27 which is providing the force with which the idler roller 12 is urging the tape 20 against the driven roller 11.

The solenoid 26 is positioned relative to the plunger 25 so that expansion of the spring 27 does not exceed the elastic limit of the spring 27 and since the force exerted by the resiliency of the spring 27 is relatively constant regardless of the degree to which the spring 27 is extended within the elastic limit of the spring 27, it will now also be understood that the force with which the idler roller 12 urges the tape 20 against the driven roller 11 is substantially constant regardless of the amplitude of the additional motion of the plunger 25 required for the plunger 25 to engage the stop 51 within the solenoid 26. Thus, the solenoid 26 may be positioned on the side member 15 in any of a variety of positions relative to the plunger 25 which result in additional motion of the plunger 25 relative to the solenoid 26 subsequent to the idler roller 12 urging the tape 20 against the driven roller 11 but which do not result in the spring 27 being expanded to a degree not within its elastic limit.

It is because of this variety of positions of the solenoid 26 relative to the plunger 25 which will all result in the idler roller 12 urging the tape 20 against the driven roller 11 with substantially the same force that the position of the solenoid 26 on the side member 15 is not initially critical and need not be carefully maintained. The result is a tape driving device 10 which is less expensive to manufacture and less expensive and difficult to maintain than prior art tape driving devices in which the force exerted by the magnetic field of the solenoid 26 on the plunger 25 is the force with which an idler roller 12 urges a magnetic tape 20 against a driven roller 11. Moreover, the variations in this force in prior art tape driving devices which result from variations in the power supply to the solenoid 26 or from variations in the position of the plunger 25 relative to the solenoid 26 when the tape is forced into engagement with the driven roller 11 by the idler roller 12 are completely eliminated by the invention.

What is claimed as invention is:

1. A tape drive device for selectively moving a tape comprising means for imparting motion to said tape, said driving means including opposed driving elements having a first position in which they engage opposite sides of said tape to impart motion to said tape and a second position in which at least one of said elements is spaced from said tape to render said elements inoperative to impart motion to said tape; and positioning means for selectively moving said elements between said first position and said second position, said positioning means including a plunger movable by a solenoid along a line of motion between a first location and a second location that is fixed relative to the solenoid, and a resilient means for operatively connecting said plunger to one of said elements so that said resilient means is extended along said line of motion by movement of said plunger from said first location to said fixed second location to provide a resilient force that is the only force urging said elements toward each other when said elements are in said first position.

2. The device of claim 1 wherein said resilient means is inoperative to provide said resilient force unless said elements are in said first position.

3. The device of claim 1 wherein said opposed driving elements are a first roller and a second roller.

4. The device of claim 3 wherein said positioning means includes a lever member having said first roller rotatably mounted thereon at a first point and having said resilient means operatively connected thereto at a second point, said lever member being mounted at a third point that is between said first point and said second point for pivotal motion about said third point.

5. The device of claim 4 wherein said solenoid is fixedly positioned relative to said second roller, and said plunger is movable relative to said solenoid in response to the energizing and de-energizing of said solenoid, said plunger having said resilient means operatively connected thereto to extend said resilient means between said plunger and said lever member.

6. The device of claim 5 wherein said resilient means is a spring.

7. The device of claim 5 wherein said pivotal motion of said lever member moves said first roller from said second position of said elements to said first position of said elements in response to a first increment of motion of said plunger relative to said solenoid when said solenoid is energized.

8. The device of claim 7 wherein said plunger and said solenoid are positioned relative to each other so that said plunger is urged by the magnetic field of said solenoid toward said second location subsequent to said first increment of motion of said plunger.

9. The device of claim 7 wherein said resilient means yields to provide additional motion of said plunger into said second location subsequent to said first increment of motion, said additional motion of said plunger being in response to the magnetic field of said solenoid.

References Cited

UNITED STATES PATENTS

| | | |
|---|---|---|
| 2,990,092 | 6/1961 | Begun. |
| 3,257,056 | 6/1966 | Cederberg. |

M. HENSON WOOD, Jr., Primary Examiner

R. A. SCHACHER, Assistant Examiner